UNITED STATES PATENT OFFICE.

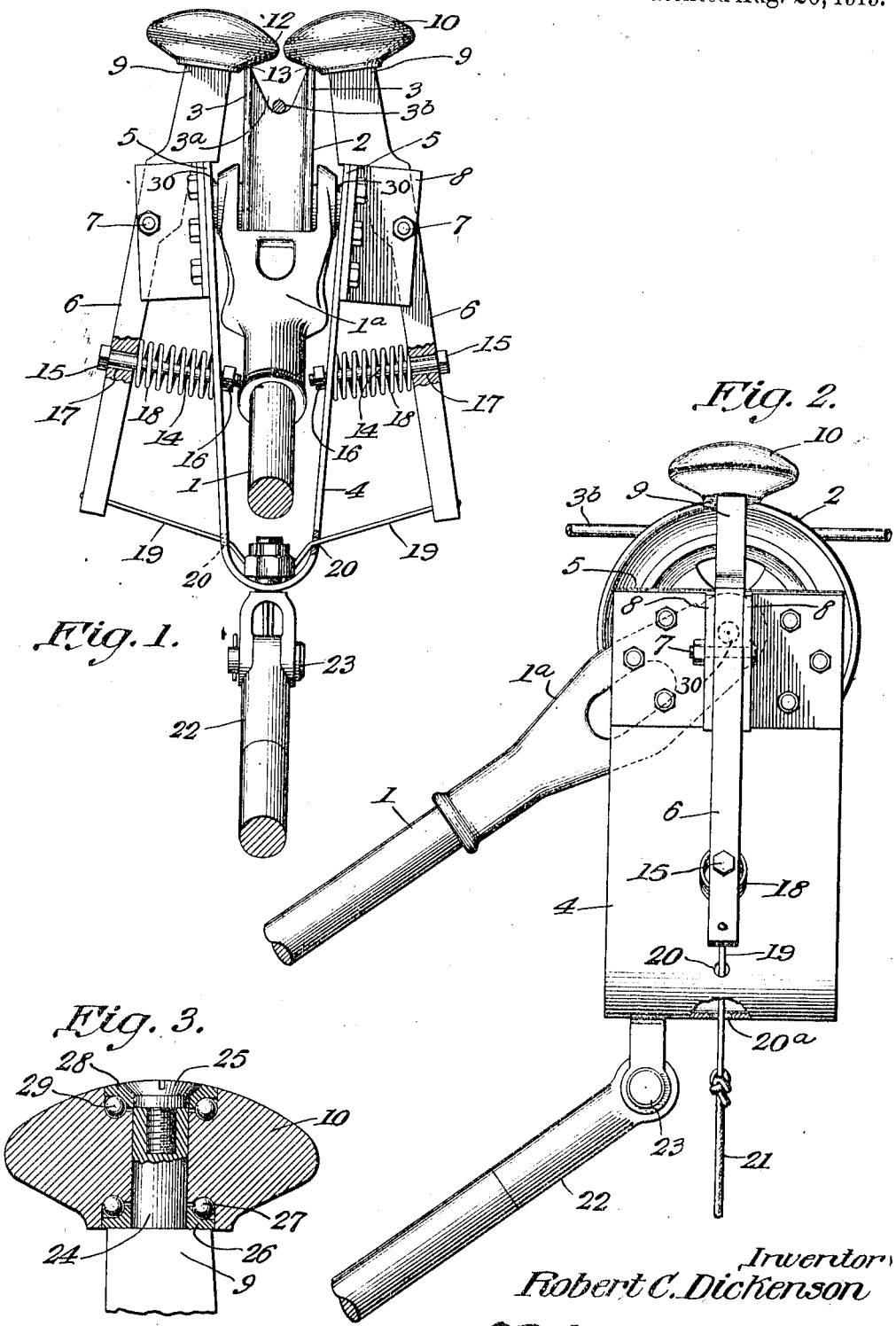

ROBERT C. DICKENSON, OF AKRON, OHIO, ASSIGNOR OF ONE-FOURTH TO WILLIAM E. WINSTON AND ONE-FOURTH TO JAMES M. BUTLER, BOTH OF AKRON, OHIO.

TROLLEY-GUARD.

1,314,130.             Specification of Letters Patent.     Patented Aug. 26, 1919.

Application filed March 26, 1918. Serial No. 224,757.

*To all whom it may concern:*

Be it known that I, ROBERT C. DICKENSON, a citizen of the United States, residing at Akron, in the county of Summit and State of Ohio, have invented certain new and useful Improvements in Trolley-Guards, of which the following is a specification.

This invention relates to trolley guards.

The object of the invention is to provide a construction by which the trolley wheel of an electric railway car is prevented from jumping the wire, especially in rounding curves and the like, and in which the normal operation of the trolley wheel is not impaired whereby unnecessary delays in the service are prevented.

The invention consists further in details of construction and combination of parts hereinafter more particularly described and claimed.

In the accompanying drawing is illustrated one embodiment of the invention in which the same reference characters designate the same parts in all the views.

Figure 1 is a front elevation of one embodiment of my invention with parts in section; and Fig. 2 is a side elevation thereof with parts in section; and Fig. 3 is a vertical sectional view through the roller.

There is here illustrated the usual trolley pole 1 terminating in a bearing head 1ª supporting a trolley wheel 2 having flanges 3 providing a groove 3ª therebetween to receive a trolley wire 3ᵇ. A U-shaped supporting member 4 embraces the head 1ª of the trolley pole. The ends of member 4 are attached by a supporting axis 30 upon which revolves the trolley wheel 2 and which axis 30 is encircled at each end by the fork of the head 1ª which freely moves upon the axis 30. Levers 6 extending longitudinally of the sides of the member 4 are pivoted at 7 intermediate their ends between ears 8 secured to the sides of the member 4. The upper ends 9 of these levers terminate at points substantially in line with the edges of the flanges 3 of the wheel 2. Knob like rollers or contact wheels 10 having frusto-conical lower portions and semi-spherical upper portions are rotatably mounted upon the upper ends of the levers 6, ball bearings being provided to reduce friction. These wheels or rollers extend inwardly, overlie the groove 3ª of the trolley wheel and prevent the disengagement of the wheel from the trolley wire by engagement at 12. The lower portions of the rollers or wheels 10 substantially engage the flanges 3 as shown at 13. Bolts or guiding members 14 having heads 15 and nuts 16 are attached to the member 4, and slidably engage the levers 6 below their pivots 7, extending through openings 17 therein. The heads 15 and bolts 16 limit the play or movement of the levers 6. Springs 18 interposed between the sides of the member 4 and levers 6 and encircling the guiding members 14 normally spread apart the lower ends of the levers causing the rollers 10 to assume the position shown in the drawing and engaging the flanges insuring electrical contact. Rollers 10 revolve around the axis 24 and are secured thereon by means of a counter sunk screw 25. To reduce friction rollers 10 rotate upon a number of balls 27 and 29 in groove rings 26 and 28.

When the car is in operation and the trolley wheel is moving along the trolley wire any projections or hangers on the trolley wire pass through these rollers without any interference whatsoever. In going around a curve the wheel 2 tends to leave the wire causing the latter to engage the rollers 10. In no case, however, will my device leave the trolley wire. My device is also capable of following a switch wire as well as a main wire and never becomes detached from the wire unless positively actuated.

When it becomes necessary to remove the trolley wheel from the wire the levers 6 may be actuated by drawing in the lower ends thereof and for this purpose I have provided wires 19 attached to the lower ends of the levers 6 extending inwardly and then downwardly through openings 20 and 20ª in the member 4 and terminating in a single line or wire 21 which can be manually operated. After pulling upon the wire 21 causing the rollers 10 to spread apart, the trolley wheel can be disengaged from the wire 3ᵇ in the usual manner.

In order to hold the member 4 in position to prevent wabbling thereof, I have pivotally attached thereto a supporting rod or brace 22, as shown at 23, which extends parallel with the pole 1 to the roof of the car, not shown, and is attached thereto in the same way that the trolley pole is attached thereto.

The advantages of my construction reside in its simplicity and in its arrangement of parts whereby the trolley wheel is maintained upon the wire at all times and in which the guard does not in any way interfere with the normal passage of the trolley wheel along the wire. By reason of the engagement of the rollers 10 with the wheel 2 perfect electrical contact is insured at all times for supplying energy to the car. The trolley wheel can be easily disengaged from the trolley wire by first pulling on the wire 21.

It is to be understood that my invention is not limited to the embodiments and features specifically shown and described herein, but that such features and embodiments are subject to changes and modifications without any departure from the spirit of the invention.

Having thus described my invention, what I claim is:

1. The combination with a trolley wheel having flanges and a bearing therefor, of a pair of rotatable rollers mounted at opposite sides of said wheel and having semispherical upper portions and frusto-conical lower portions overlying and engaging the flanges of said wheel.

2. The combination with a trolley wheel having flanges and a bearing therefor, of a pair of rotatable rollers movably mounted at opposite sides of said wheel and overlying and engaging the flanges of said wheel, means tending to maintain said rollers in engagement with said flanges and means for moving the rollers out of engagement with the flanges.

3. The combination with a trolley wheel and a bearing therefor, of a U-shaped supporting member attached to said bearing at opposite sides of said wheel and extending below the same, levers pivoted to said member at opposite sides thereof and provided with means overlying the wheel vertically above the same to prevent disengagement of the trolley wheel, means interposed between said member and the levers for guiding the levers and holding their lower ends projected, and actuating wires attached to the levers and extending inwardly through the sides of said member, and then downwardly through the bottom thereof.

4. The combination with a trolley wheel having flanges and a bearing therefor, of a U-shaped supporting member attached to said bearing at opposite sides of the wheel and extending below the same, levers pivoted intermediate their ends to said member, means attached to said member and slidably engaging the lower portions of said levers for guiding the same, springs interposed between said member and levers and encircling said guiding means to normally hold the lower ends of the levers projected, members mounted at the upper ends of said levers, overlying the trolley wheel, and substantially engaging the flanges thereof, actuating wires attached to the lower ends of said levers and extending inwardly through the sides of said member, and then downwardly through the bottom thereof, and means for holding the said member in position to prevent wabbling thereof.

In testimony whereof I affix my signature in the presence of two witnesses.

ROBERT C. DICKENSON.

Witnesses:
JOHN HOISE,
THOS. E. GREENE, Jr.